No. 12,780. REISSUED APR. 21, 1908.

E. GODLEY.

BRAKE SETTING DEVICE.

APPLICATION FILED FEB. 1, 1908.

Witnesses:
G. W. Paulbeschmitt
L. F. Stish

Inventor
Ellsworth Godley.
By G. L. Gregg
Atty

THE NORRIS PETERS CO., WASHINGTON, D. C.

UNITED STATES PATENT OFFICE.

ELLSWORTH GODLEY, OF SPRINGFIELD, ILLINOIS.

BRAKE-SETTING DEVICE.

No. 12,780. Specification of Reissued Letters Patent. Reissued April 21, 1908.

Original No. 826,780, dated July 24, 1906, Serial No. 301,476. Application for reissue filed February 1, 1908. Serial No. 413,972.

*To all whom it may concern:*

Be it known that I, ELLSWORTH GODLEY, a citizen of the United States, residing at Springfield, in the county of Sangamon and State of Illinois, have invented a certain new and useful Improvement in Brake-Setting Devices, of which the following is a full, clear, concise, and exact description, reference being had to the accompanying drawings, forming a part of this specification.

My invention relates to brake-setting devices usable in connection with the air-brake system of railway-trains and adapted to automatically set the brakes on all of the cars of the train in case of accident or emergency, such as collision, the breakage of an axle, or the derailment of a wheel.

The purposes of my invention are to provide a brake-setting device operative by the pressure of the air of the main-line service-pipe of an air-brake system and rendered effective by an abnormal lurching or jolting of the car with which it is connected, said brake-setting device being of low first cost, free from complicated parts liable to breakage or derangement, easily attachable to the main-line service-pipe of the systems now in use, and simple and effective in operation.

With these ends in view my invention consists in the novel features of construction and combinations of parts shown in the annexed drawings, to which reference is hereby made.

Figure 2:
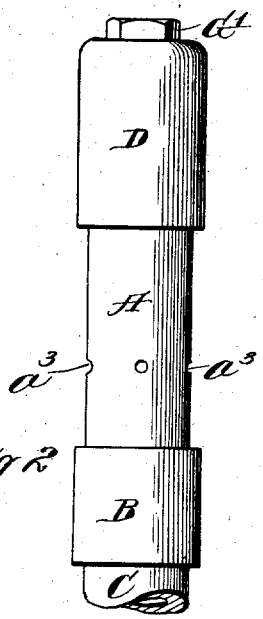
Figure 1:
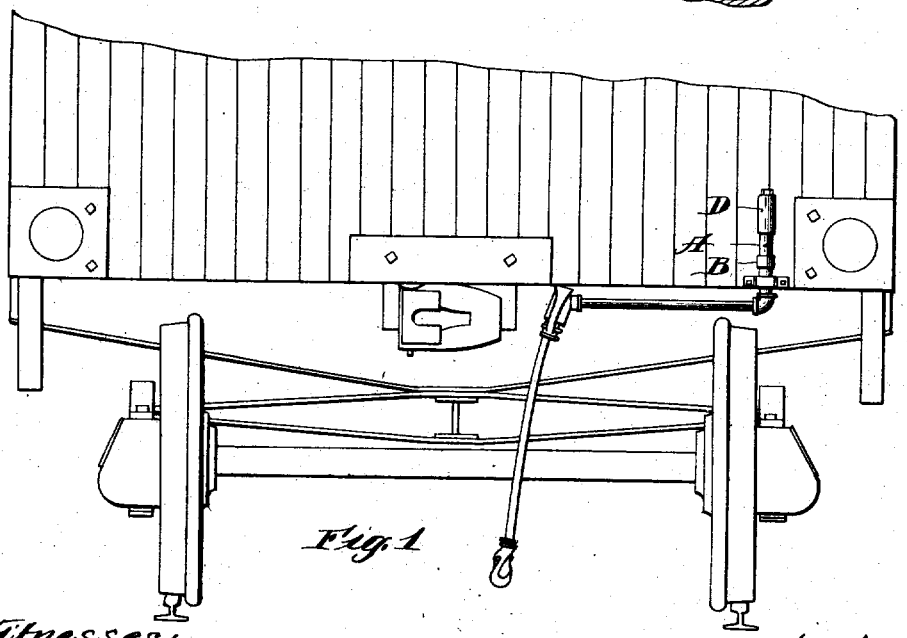

Referring to the drawings, in which similar reference-letters designate like parts in the several views, Figure 1 is a diagram, on a reduced scale, illustrating the connection of the brake-setting device with a car. Fig. 2 is an elevation of the brake-setting device, and Fig. 3 is an axial section through the brake-setting device.

The cylinder A is of metal and has a smoothly-finished circular bore, a reduced central bore $a$, screw-threaded parts $a^1$ and $a^2$, and vents $a^3$. A coupling B connects the cylinder A with the service-pipe C. A cylindrical-cap D has a central hole $d$, a screw-threaded part $d^1$ matching the screw $a^1$, and integral downwardly-extending lugs $d^2$. An annulus E has an integral internal ledge $e$ and an integral external circumferential ledge $e^1$. Latches F oscillate on pivots $f$ on the lugs $d^2$ and have integral fingers $f^1$ fitting in a circumferential groove $g^3$ around the piston-rod. The piston G has an enlarged part $g$ fitting in the bore of the cylinder A and a reduced part $g^1$ fitting in the reduced bore $a$. The piston-rod $g^2$ is preferably integral with the piston G and has a circumferential groove $g^3$ and a screw-threaded part $g^4$. A nut $G^1$ fits on the screw $g^4$. An annular weight H fits loosely within the cylinder A, normally lies on top of the piston G, and slides freely on the piston-rod $g^2$. When the annulus E rests on top of the cylinder A, as shown in Fig. 3, the lower parts of the latches F are pressed inward and the fingers $f^1$ of the latches lie in the groove $g^3$, and when the annulus is raised the latches act by gravity to withdraw the fingers from the groove. Packing-rings $g^5$ occupy grooves in the reduced part $g^1$ of the piston and prevent leakage of air.

Figure 3:
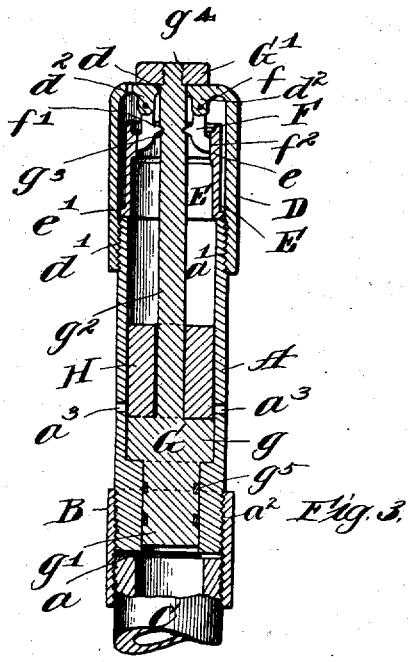

When the parts are assembled, as shown in Fig. 3, the enlarged part $g$ of the piston rests on the bottom of the cylinder, the piston-rod $g^2$ extends upward through and is slidable freely in the hole $d$ of the cap D, the weight H lies on top of the piston, the ledge $e^1$ of the annulus E rests on the upper end of the cylinder A, the fingers $f^1$ of the latches F lie in the groove $g^3$, and the ledge $e$ lies against the members $f^2$ of the latches F and prevents outward movement of the latches.

The operation of the device is as follows: Upon the occurrence of an accident such as a collision or the derailment of a wheel the shock or the bumping of the wheels on the derailed side of the car causes violent oscillation or bumping of the car, which in turn causes violent bouncing of the weight H within the cylinder, and the weight moving rapidly upward strikes against the lower end of the annulus E and raises the annulus sufficiently to raise the ledge $e$ above the downwardly-extending members $f^2$ of the latches F, so as to permit the latches to gravitate and withdraw the fingers $f^1$ from the groove $g^3$, whereupon the air-pressure acts on the lower end of the piston to force the piston upward until the part $g$ passes the vents $a^3$ and permits the escape of air through the vents, thereby reducing the air-pressure in the train-pipe C and causing the application of the brakes of the whole system in the usual well-known manner.

I have illustrated the device of my invention as being employed in connection with the Westinghouse air-brake system, but I do not wish to be limited to the class of air-brake systems in connection with which my invention may be employed.

The cylinder A constitutes a continuation of the service-pipe C, through which continuation the air passes when the device of my invention is operated. The piston G with its extension $g^1$, constitutes a valve which normally operates to close communication between the service-pipe and the external air. The annulus E and the latches F, together with the grooved portion of the piston-rod $g^2$, constitute restraining mechanism that normally prevents the air within the service-pipe C, that is pressing upon the under surface of the piston, from raising the piston. The weight H acts, when set in motion, as a key or device to release the locking or restraining mechanism from its restraining influence upon the valve, so as then to permit the air within the service-pipe to unseat the valve, thereby to permit the air under pressure to escape from the service pipe, whereby the brakes may become set.

Having fully described my invention, what I claim as new, and desire to secure by Letters Patent, is—

1. The combination of a cylinder having air-vents, a cap screwing onto said cylinder and having a central hole, a piston fitting in said cylinder and having a piston-rod slidable in the central hole of the cap, also having a circumferential groove, said piston being adapted to receive at one end the air-pressure of the main service-pipe of an air-brake system; gravitating latches mounted within said cap and having fingers fitting in the groove around the piston-rod; an annulus supported on the cylinder and adapted to hold the fingers of the latches in the groove around the piston-rod and a weight slidable on the piston-rod and striking against the annulus to move the annulus and release the latches.

2. The combination of a cylinder, a piston moving in said cylinder and acted upon by the air of the main service-pipe of a brake system, latches adapted to prevent movement of the piston in the cylinder, and a weight operative by concussion to release said latches.

3. The combination of a cylinder, a cap secured on said cylinder, a piston acted upon by the air-pressure of the main service-pipe of an air-brake system and having a piston-rod slidable in a central opening in the cap, latches mounted on said cap and adapted to engage the piston-rod, a latch-retaining device holding the latches in engagement with the piston-rod, and a weight within the cylinder operating by concussion to move the latch-retaining device.

4. A brake-setting appliance for air-brake systems including a service air pipe, sealing means for the air pipe, restraining mechanism for normally holding the sealing means closed, and a weight adapted, upon violent movement of the brake-setting appliance, to be brought into operative connection with the restraining mechanism to cause said restraining mechanism to release the sealing means, the air within the service-pipe serving to open the sealing means when said sealing means are released.

5. A brake-setting appliance for air-brake systems including a service air pipe, sealing means for the air pipe, restraining mechanism for normally holding the sealing means closed, and an automatically operated device operable upon violent movement of the brake-setting appliance, for releasing the restraining mechanism, thereby to release the sealing means, the air within the service-pipe serving to open the sealing means when said sealing means are released.

6. A brake-setting appliance for air-brake systems including a service air pipe, sealing means for the air pipe, and mechanism normally holding the sealing means closed and permitting the release of the sealing means upon violent movement of the brake-setting appliance, the air within the service-pipe serving to open the sealing means when said sealing means are released.

7. A brake-setting appliance for air-brake systems including a service air pipe, valve mechanism normally sealing the air pipe, and a weight operating upon violent movement of the brake-setting appliance to release the valve.

In witness whereof, I hereunto subscribe my name this 27th day of December, 1907.

ELLSWORTH GODLEY.

Witnesses:
G. L. Cragg,
L. G. Stroh.